(No Model.)
A. CLAYPOOL.
RUBBER TIRE FOR WHEELS.
No. 431,223. Patented July 1, 1890.
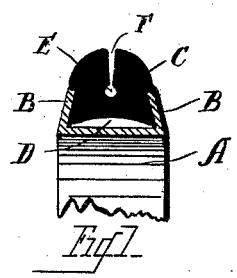
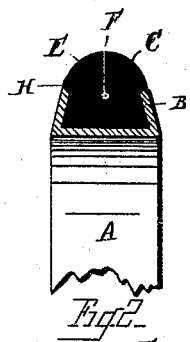
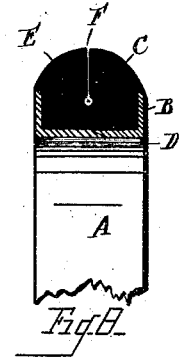
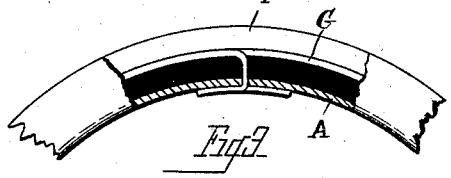
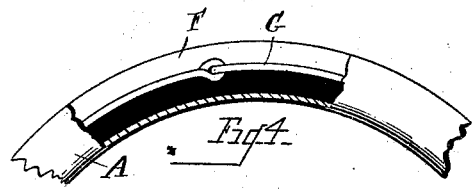
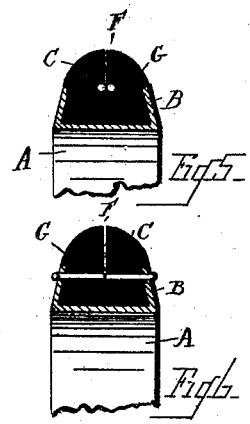
WITNESSES
Carroll J. Webster.
Floyd R. Webster
INVENTOR.
Albert Claypool
By Wm Webster
Atty

UNITED STATES PATENT OFFICE.

ALBERT CLAYPOOL, OF TOLEDO, OHIO.

RUBBER TIRE FOR WHEELS.

SPECIFICATION forming part of Letters Patent No. 431,223, dated July 1, 1890.

Application filed October 21, 1889. Serial No. 327,749. (No model.)

*To all whom it may concern:*

Be it known that I, ALBERT CLAYPOOL, a citizen of the United States, residing at Toledo, in the county of Lucas and State of Ohio, have invented certain new and useful Improvements in Rubber Tires for Wheels and Means for Holding the Same in Place; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to rubber tires for wheels and means for holding the same in place, and has for its object to provide a novel form of tire with an adaptability of being secured upon a wheel-rim by one or more encircling wires having a position within the interior of the tire, but removably secured therein, whereby the tire shall be removable from the wheel-rim or felly, and the means for securing the same shall be inexpensive.

A further object is to provide a tire of that construction that the base thereof shall be expanded tightly within a channeled wheel-rim to cause a rigid base-bearing for the tire upon three sides to effect a solid tread thereof.

A further object is to provide for securing the wires that hold the tire in place by threading the same through the rim.

The invention consists in the parts and combination of parts hereinafter described, and pointed out in the claims.

In the drawings, Figure 1 is a transverse section of a wheel-rim and rubber tire placed therein previous to securing the same upon the rim. Fig. 2 is a like view showing the position of the tire when the tightening band or wire has forced the tire firmly upon the rim, and also with the flanges of the rim bent to embrace the sides of the rubber tire. Fig. 3 is a side elevation of a section of wheel-rim with the rubber tire secured therein, with a portion of the rim and tire broken away to disclose one form of securing the tightening-band to the wheel-rim. Fig. 4 is a like view showing the tightening-band secured within the tire. Fig. 5 is a transverse section of the rim and tire, showing two strands of tightening-band employed in holding the tire in place; and Fig. 6 is a transverse section of the tire and rim, and showing the tightening-band secured to the rim by being passed through perforations in the flanges and secured. Fig. 7 is a transverse section of a wheel-rim with a rectangular channel and the tire resting therein prior to being compressed therein by the tightening-band. Fig. 8 is a like view showing the tire secured by the tightening-band and the arched base forced to a plane parallel with the horizontal portion of the rim.

A designates the rim of the wheel formed with flanges B.

C designates my improved rubber tire, the base portion D of which is concave or upwardly arched, as seen in Figs. 1 and 7. Above the concave portion there is a circumferential channel or perforation E to receive the tightening-band, and for the purpose of allowing the concave or arched base to expand and contract, and also to permit the passage of the band through to the channel there is a circumferential slit or opening F, leading from said channel or perforation to the outer surface of the tire. The tire being of this construction, it will be evident that as the arched base is forced down so as to lie flat upon the rim the sides of the base will be expanded, so as to be firmly engaged by the flanges of the rim, and the slit or opening F will be firmly closed.

G represents a tightening-band, preferably of wire, which is passed through the slit or opening F and into the channel E of the tire. When the band has been drawn so as to compress the base of the tire tightly upon the rim, its ends are passed through perforations in the base of the rim, as seen in Fig. 3, and are secured in any suitable manner to prevent movement of the band; or the perforations may be through the flanges of the wheel-rim and the ends of the band passed therethrough and secured, as shown in Fig. 6; or the band may be secured by looping and twisting its ends, as shown in Fig. 4.

Instead of using but one tightening-band G, it is evident that I may use a plurality of such bands, as seen in Fig. 5.

In practice I prefer to turn the flanges of the rim inward slightly to form a dovetail channel for the reception of the expanded side of the base portion of the tire; but it will be apparent that I may employ a rim with a rectangular channel and form the tire with an arched base to normally rest thereon and secure the same in place by means of the band G, as shown in Figs. 7 and 8.

In the preferred manner of fastening the tire of the wheel-rim the flanges B are first inwardly inclined to form the dovetailed channel when the tire is inserted, the base of the tire being of slightly less width than the widest portion of the channel. The tightening-band is then inserted and put in sufficient tension to cause the base of the tire to seat firmly upon the rim, thereby causing an expansion of the base of the tire sufficient to cause the same to closely fit within the dovetailed channel when the ends of the band are secured in any preferred manner.

In constructing the tire I prefer to form overlapping shoulders H, which bear upon the edges of the flanges, and assist the tightening-band in closing the slot F tightly to cause an equal traction upon the rubber upon each side thereof, this result being assisted in forcing the arched base to a plane, thereby causing the portions separated by slot F to bear firmly upon each other.

By the construction described, when it is desired to remove the tire it is only necessary to release the end fastenings of the band or bands G, when the tire will contract at the base, thereby allowing of easy removal.

What I claim is—

1. As an article of manufacture, a rubber tire having a concave base, a circumferential channel or perforation above the concavity of the base, and a circumferential opening from said channel or perforation to the outer surface of the tire, for the purposes set forth.

2. In combination with a flanged wheel-rim, a rubber tire having a concave base and one or more bands embedded in the tire for drawing the concave portion down upon the rim, substantially as set forth.

3. The combination, with a flanged wheel-rim, of a rubber tire having a concave base, a channel above the concavity of the base, and a circumferential opening from said channel to the outer surface of the tire, and a tightening-band within the channel, for the purposes set forth.

4. The combination, with a flanged wheel-rim, of a rubber tire having a concave base, a channel above the concavity of the base, a circumferential opening from said channel to the outer surface of the tire, and a shoulder on each side of the tire, and a tightening-band within the channel, for the purposes set forth.

In testimony that I claim the foregoing as my own I hereby affix my signature in presence of two witnesses.

ALBERT CLAYPOOL.

Witnesses:
WILLIAM WEBSTER,
CARROLL J. WEBSTER.